United States Patent [19]
Hwang

[11] Patent Number: 5,687,339
[45] Date of Patent: Nov. 11, 1997

[54] PRE-READING AND PRE-DECODING OF INSTRUCTIONS OF A MICROPROCESSOR WITHIN SINGLE CYCLE

[75] Inventor: Jyh-Guo Hwang, Taipei, Taiwan

[73] Assignee: Elan Microelectronics Corp., Hsin-Chu, Taiwan

[21] Appl. No.: 528,165

[22] Filed: Sep. 14, 1995

[51] Int. Cl.⁶ ........................................................ G06F 9/38
[52] U.S. Cl. .......................... 395/383; 395/389; 395/584; 395/382
[58] Field of Search ................................... 395/380, 387, 395/421.03, 571, 572, 584, 800

[56] References Cited

U.S. PATENT DOCUMENTS

| | | | |
|---|---|---|---|
| 4,709,324 | 11/1987 | Kloker | 395/383 |
| 4,722,050 | 1/1988 | Lee et al. | 395/381 |
| 4,961,162 | 10/1990 | Nguyenphu et al. | 364/748 |
| 5,165,025 | 11/1992 | Lass | 395/582 |
| 5,197,136 | 3/1993 | Kimura et al. | 395/585 |
| 5,459,847 | 10/1995 | Okamura | 395/421.03 |
| 5,590,358 | 12/1996 | Mizrahi-Shalom et al. | 395/800 |

*Primary Examiner*—William M. Treat
*Attorney, Agent, or Firm*—Jacobson, Price, Holman & Stern, PLLC

[57] ABSTRACT

The present invention relates to a method of pre-reading and pre-decoding of instructions of a microprocessor, which allows each of all instructions to be executed within a single cycle without being influenced by the instructions such as jump, etc. This is achieved mainly by, at the same time that an instruction is executed, pre-reading next two instructions and deciding if the first one of the next two instructions is a call, jump or conditional instruction, in order to change the value of the program counter of the microprocessor before the completion of the execution of said instruction, thereby eliminating the time-consuming phenomenon caused by said change of the value of the program counter and rasing the processing speed in the microprocessor. A structure for the pre-reading of the next two instructions is also disclosed in the present invention.

3 Claims, 3 Drawing Sheets

PRE-READING AND PRE-DECODING OF INSTRUCTIONS OF A MICROPROCESSOR WITHIN SINGLE CYCLE

FIELD OF THE INVENTION

The present invention relates in general to the field of reading and decoding of instructions of a microprocessor, and more particularly to an improved method and structure for pre-reading and pre-decoding of the instructions within a single cycle.

Background of the Invention

Conventional microprocessors with multiple-cycle instructions (CISC, complicated instruction set) are obviously time-consuming and low-efficient. Thus, there have been available in the market many kinds of microprocessors called "single word processor." The structures thereof are modified such that the execution of one instruction can be completed by only consuming one clock cycle, thereby relatively increasing the efficiency of the execution of relevant programs. Continuous researches have been made toward this objective, which is also the trend of nowadays development of microprocessors.

Although the so-called single-cycle-instruction microprocessor is available in the market, actually in its instruction groups, not all instructions completely belong to the type of single cycle. Some special instructions, such as accumulation concerning program counter, jumpy call, return and conditional branch, etc., all require an additional cycle to obtain the proper value of the program counter so as to indicate the address of the next instruction. The method of the execution of a program in said microprocessor is illustrated by reference to FIG. 1 which shows a flow chart for conventional pipeline instructions. The read and execution procedures are separately located at the upper and lower portions in FIG. 1. When JUMP instruction of the program is executed (as shown in FIG. 1, close to its right side), it is necessary to load the jumped address into the program counter since the relevant program counter is not added by 1 as usual. After said load step, a NOP (no operation) instruction should be added to allow the program counter to load said jumped address. Under such circumstances, the program must wait for "a clock cycle" to execute a next instruction. This phenomenon results in the failure to achieve the effect of a single cycle instruction. Besides, a practical statistics of various programs reveals that the rate of using call, jump and conditional instructions in a program is up to about 15%. In other words, such an instruction which requires consuming two instruction cycles may occur once in every six instructions. If said problem is solved, the execution speed of the microprocessor can be improved with an addition of about 10–20%.

In view of the above, the present invention is provided with a novel and creative method for executing the instructions in the microprocessor, which successfully overcomes said defect of consuming more instruction cycles to change the value of the program counter, achieving the increase of the efficiency of the microprocessor.

SUMMARY OF THE INVENTION

One objective of the present invention is to provide a method of pre-reading and pre-decoding of the instructions of the microprocessor. The main feature of the present invention is to pre-read next two instructions in the procedure of reading a program, store said two instructions respectively, pre-decode the first one of said two instructions, decide whether the first instruction is one as mention above which changes the value of the program counter, and change the value of the program counter to a proper one, such that when a next instruction is executed, due to said pre-process, the execution can be completed through a single cycle instruction of NOP, whereby eliminating the limitation to the efficiency in conventional microprocessor caused by requiring additional instruction cycles.

Another objective of the present invention is to provide a structure of the pre-reading of the instructions of the microprocessor. The structure for pre-reading the instructions includes two sets of memories matched with each other, where the odd and even data are connected to two buses respectively, such that when one instruction is read, the contents of its next two instructions are transferred through said pre-reading structure to the odd and even buses respectively, achieving the effect of pre-reading the next two instructions. This pre-reading structure can, based on its practical size, also adopt a configuration of one-dimension array.

BRIEF DESCRIPTION OF THE DRAWINGS

A more complete understanding of the present invention may be acquired by referring to the detailed description and claims when considered in connection with the accompanying drawings wherein:

DETAILED DESCRIPTION OF THE PREFERRED EMBODIMENTS

The single cycle instruction provided in the present invention is achieved by the so-called "adjacent two-instruction pre-reading" operation that pre-reads next two instructions, followed by a "pre-decoding" operation that pre-decodes the first one of the next two instructions. The effect of enabling the pre-reading of the next two instructions is to enable the pre-decoding of the first one of the pre-read two instructions within said pre-decoding operation so as to decide if the pre-read first instruction is a call, jump or conditional instruction. According to this decision, the value of the program counter is then changed directly, thereby eliminating the time-consuming phenomenon caused by the setting of the program counter till the program execution period and allowing each of all instructions to be executed within a single instruction cycle.

Figure 1:
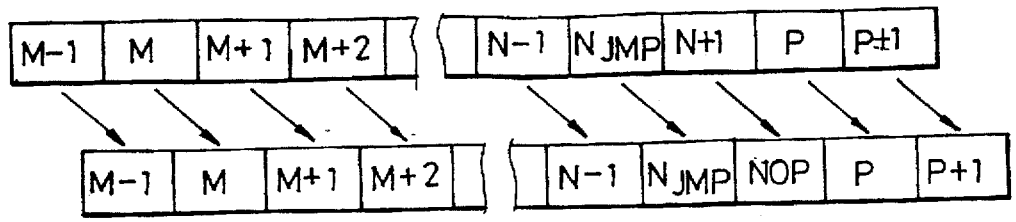
FIG. 1 is a flow chart for conventional pipeline instructions.
Figure 2:
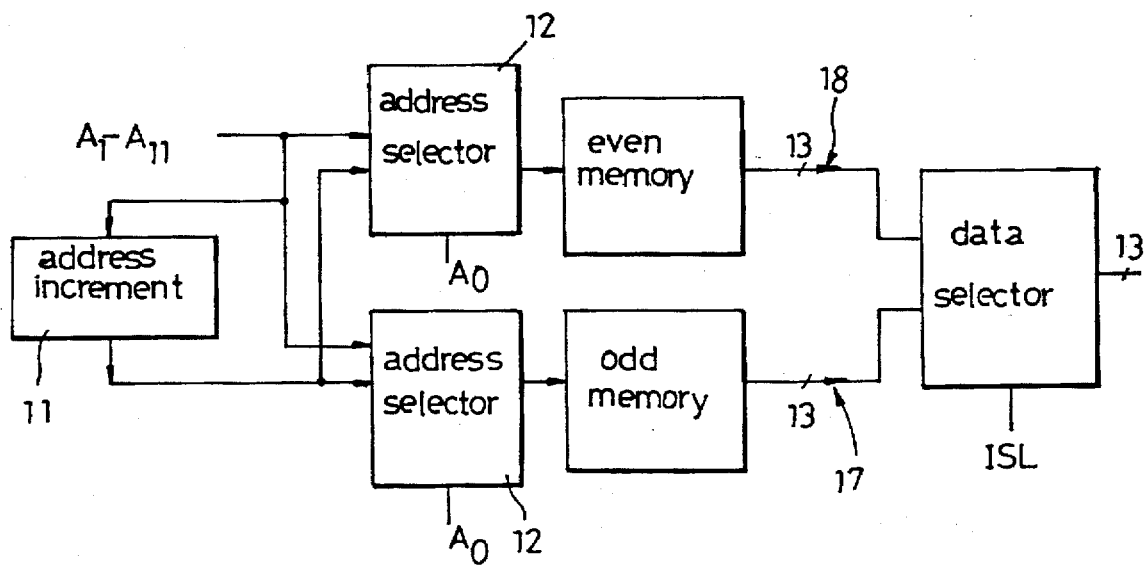
FIG. 2 is a circuit block diagram of the adjacent two-instruction pre-reading structure of the present invention.

The method of the pre-reading and pre-decoding of the instructions according to the present invention will be described in sequence hereinafter. The pre-reading of the instructions is achieved by a hardware structure. An embodiment of the structure is shown in FIG. 2 Where data bus is arranged to have 13 lines while the address bus has 12 lines. First, the original value on address lines $A_1$–$A_{11}$ is increased by 1 through address increment (11) and the increased value is then transferred to address selector (12) located before the even/odd memories. Address Selector (12) is controlled by address line $A_0$. If $A_0$=0, the increased value on address lines $A_1$–$A_{11}$ is transferred to the odd memory, and the original value on address lines $A_1$–$A_{11}$ is transferred to the even memory. On the contrary, if $A_0=1$, the increased value on address lines $A_1$–$A_{11}$ is transferred to the even memory and the original value on address lines $A_1$–$A_{11}$ is transferred to the odd memory. An operation of pre-decoding of the data in the even/odd memories is followed. Thus, in the above reading transfer pipeline, at the time of program reading, the next two machine codes (instructions) to be executed can be read out through said pre-reading structure and stored on the data buses of the odd and even memories, respectively, achieving the effect of reading adjacent two instructions. The retrieval of the data on one of said data buses is performed through the signal, 0 or 1, on an instruction select line (ISL) to control a data selector so as to decide which one of said data buses to be connected to the data bus of the microprocessor.

Figure 3:
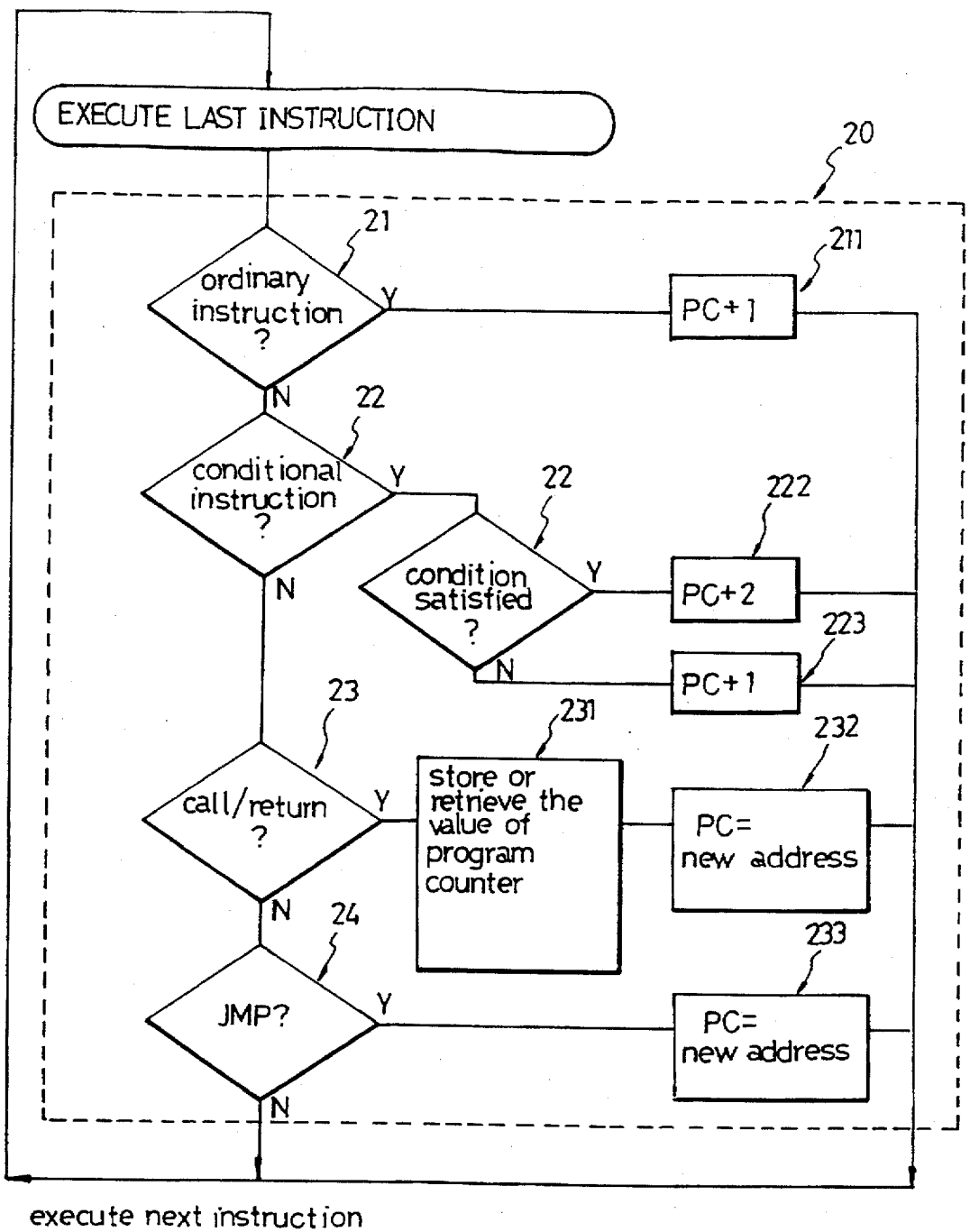
FIG. 3 is a flow chart for the decision in the pre-decoding of the present invention.

After said pre-reading of the next two instructions, it proceeds to perform the pre-decoding of the first one of the pre-read two instructions. The pre-decoding is used to decide if the first pre-read instruction is an ordinary, conditional, call/return, or jump instruction, so as to achieve the control of the desired value of the program counter of the microprocessor. In this way, the value of the program counter can be properly set in advance before the completion of execution of a last instruction, thereby solving the problem of consuming more clock cycles caused by the program counter control by conventional microprocessors. The method of the pre-decoding is illustrated with reference to the flow chart as shown in FIG. 3. After the step of the execution of a last instruction begins, it immediately enters the four routes of the pre-decoding (20). When the first one of the pre-read two instructions is identified as an ordinary instruction (21) such as MOVE or ADD, the value of the program counter will be added by 1 (211) after the completion of the execution of said last instruction. When the first one of the pre-read two instructions is identified as a conditional instruction (22) such as JIZ (jump if zero) or the like, it is necessary to prepare for next two instructions, which is completed through the arithmetic logic unit (ALU) of the microprocessor to decide whether the condition is satisfied (221). When satisfied, the value of the program counter will be added by 2 (222), i.e. skipping next instruction. When not satisfied, the value of the program counter will still be added only by 1 (223), i.e. not performing the skipping step. When the first one of the pre-read two instructions is identified as a call/return instruction (23), at first the current value of the program counter will be stored or the original value of the program counter will be retrieved (231), and then the value of the program counter will be set to a new address (232). When the first one of the pre-read two instructions is identified as a jump instruction (24), the value of the program counter will be directly set to a new address (233). After said steps of the identification of the pre-read instruction as well as the alteration of the value of the program counter have been completed, it proceeds to the step of executing a next instruction (26), and again in a cycle pre-decodes the first one of the pre-read two instructions (21), such that the value of the program counter can be periodically set in advance. Thus, the operation of the pre-decoding is to preset the value of the program counter to a proper one before the execution of a next instruction.

Figure 4:
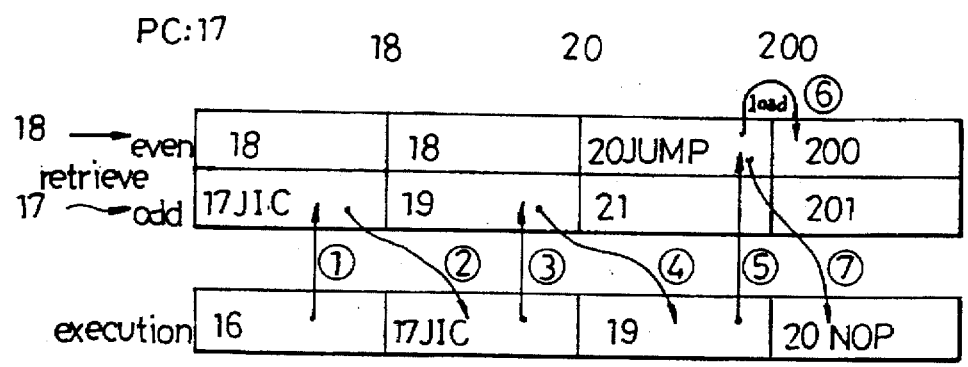
FIG. 4 is a schematic diagram of the method of the present invention.
Figure 4:
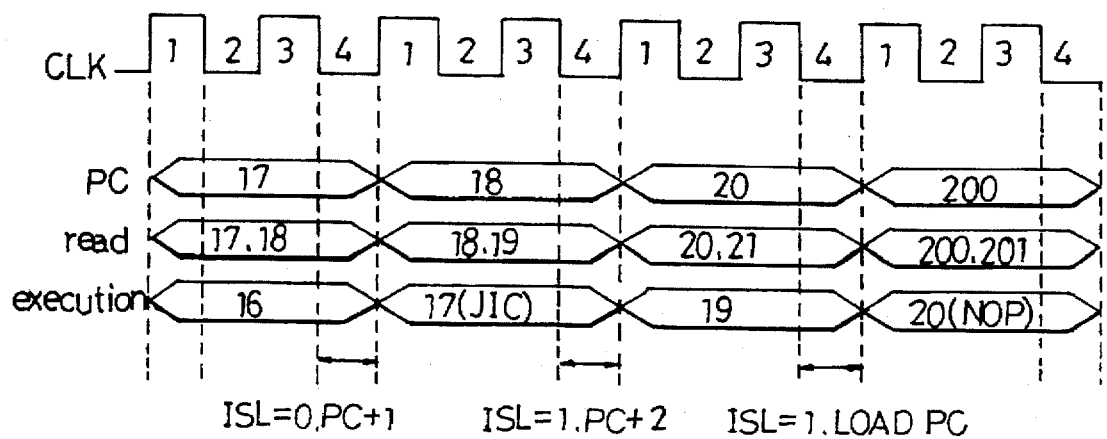

The practical operations of the pre-reading and pre-decoding as mentioned above are explained in the following by reference to a program example. As shown in FIG. 4, there are provided, from top to bottom, with the contents of the program, the schema of a transfer pipeline, and a timing diagram, respectively. As shown in the schema of the transfer pipeline located in the middle of FIG. 4, when the execution of the instruction at address 16 begins, at the same time, the instructions at addresses 17 and 18 are read out and stored on odd memory bus (17) and even memory bus (18), respectively, and then the instruction at address 17 is pre-decoded. Since the instruction at address 16 is an ordinary one, after its execution, the value of the program counter is added by 1 to equal 8, and then the instruction at address 17 is executed. Due to the above pre-decoding of the JIC conditional instruction at address 17, it is recognized that the value of the program counter should be added by 2. Hence, when the instruction at address 17 is executed, the value of the program counter is automatically set to be added by 2, i.e. the value of the program counter now equals 20. In accordance with this value, the instruction at address 19 stored on odd memory bus (17) is then retrieved and executed. When the instruction at address 19 is executed, the instructions at addresses 20 and 21 are pre-read out, and the instruction at address 20 is then pre-decoded. Since the instruction at address 20 is JUMP 200, after execution of the instruction at address 19, the value of the program counter is automatically set to 200, and the instructions at addresses 200 and 201 are then read out. As a result, when the JUMP instruction at address 20 is executed, due to the previous pre-decoding and setting of the program counter to a proper value, the instruction at address 20 as executed on the right side in the middle of FIG. 4 is replaced by a "NOP" instruction. After the execution of this instruction, the instruction at address 200 is directly retrieved and executed.

In the above program including JIC and JUMP instructions, through said pre-reading of the next two instructions, when the JIC instruction is executed to perform the skip step, it is allowed to be retrieved and executed promptly by selecting the instructions located on odd memory bus (17) or even memory bus (18). And, when the next instruction is pre-decoded and identified as a JUMP instruction, the value of the program counter will be set to a proper one after the execution of the previous instruction; the two instructions at addresses of the program counter will be read out from odd or even memory bus; and the location of said JUMP instruction is replaced by a NOP instruction, thereby causing the instruction to be in a status of no operation such that the instruction at address 200 can be directly retrieved and executed. Accordingly, the execution of each of time-consuming instructions within a single instruction cycle can be achieved.

In conclusion, the present invention is more efficient than the conventional microprocessors in that it allows adjacent two instructions to be pre-read and stored on odd and even memory buses, respectively, together with the pre-decoding of the first one of the pre-read two instructions so as to decide if the first pre-read instruction is a jump, call/return, or conditional instruction, whereby making the program counter set to a proper value, followed by a pre-reading of two instructions at addresses of the program counter again, such that the process of the program counter with altered value An the microprocessor can be completed within a single clock cycle.

Although this description describes the present invention with reference to the above specific embodiments, it is not intended that such description be considered as limitations upon the scope of the present invention except in-so-far as set forth in the following claims.

What is claimed is:

1. A method of pre-reading and pre-decoding of instructions of a microprocessor, the method comprising:

a) pre-reading the next two instructions of a currently executed instruction, said pre-read next two instructions being stored in an odd memory bus and an even memory bus, respectively;

b) pre-decoding the first one of said pre-read next two instructions, thereby deciding if the pre-decoded first instruction is a jump, call/return, conditional or ordinary instruction; and c) setting the value of the program counter of the microprocessor to a proper one based on said decision before a next instruction is executed, wherein when said pre-decoded first instruction is identified as a conditional instruction, said pre-read instructions stored in either said odd or even memory bus is retrieved and executed based on the operation result of the condition; when said pre-decoded first instruction is identified as a jump or call/return instruction, the value of the program counter is set to the address given in said jump or call/return instruction, and at the same time the instructions at next two addresses of said set address are pre-read and respectively stored in said odd and even memory buses, and when said jump or call/return instruction is executed, said jump or call/return instruction is replaced by a NOP (no operation) instruction, such that each of said instructions can be executed within a single clock cycle.

2. The method according to claim 1, wherein the step of pre-decoding instructions further comprises:

d) adding the value of the program counter by 1 if said pre-decoded first instruction is an ordinary instruction;

e) adding the value of the program counter by 1 or 2 based on whether the operation condition is satisfied or not if said pre-decoded first instruction is a conditional instruction;

f) storing the current value of the program counter or retrieving the original value of the program counter at first and then setting the program counter to be the value given in a call/return instruction if said pre-decoded first instruction is the call/return instruction;

g) setting directly the value of the program counter to be a value given in a jump instruction if said pre-decoded first instruction is the jump instruction; and h) executing a next instruction and repeating said pre-decoding of instructions after each of said alterations of the value of the program counter.

3. A structure for pre-reading next two instructions of a currently executed instruction in a microprocessor, the structure comprising:

a) an address increment for increasing an inputted address $A_1$–$A_{11}$ by 1;

b) two address selectors for respectively selecting an address from said inputted address and said increased address based on an address $A_0$;

c) odd and even memories for respectively outputting a responding data based on one of said selected addresses; and d) a data selector for selecting a data from said outputted data based on an instruction selection line, thereby achieving said pre-reading of the next two instructions.

* * * * *